United States Patent

Schnell et al.

(10) Patent No.: US 12,510,566 B2
(45) Date of Patent: Dec. 30, 2025

(54) SYSTEMS AND METHODS FOR DETECTION OF PRESENCE OF NON-ELECTRICAL COMPONENT

(71) Applicant: Dell Products L.P., Round Rock, TX (US)

(72) Inventors: Arnold Thomas Schnell, Hutto, TX (US); Adedoyin Oluwaseun Odesola, Georgetown, TX (US); Sofia Loya, El Paso, TX (US)

(73) Assignee: Dell Products L.P., Round Rock, TX (US)

( * ) Notice: Subject to any disclaimer, the term of this patent is extended or adjusted under 35 U.S.C. 154(b) by 443 days.

(21) Appl. No.: 18/164,982

(22) Filed: Feb. 6, 2023

(65) Prior Publication Data

US 2024/0264207 A1    Aug. 8, 2024

(51) Int. Cl.
*G01R 19/00*    (2006.01)
*H05K 1/16*    (2006.01)

(52) U.S. Cl.
CPC ......... *G01R 19/0046* (2013.01); *H05K 1/165* (2013.01)

(58) Field of Classification Search
CPC ............................ G01R 19/0046; H05K 1/165
See application file for complete search history.

(56) References Cited

U.S. PATENT DOCUMENTS

2005/0088303 A1\*   4/2005   Allen ................... G08B 13/149
340/568.4

OTHER PUBLICATIONS

Fargo Controls, Inc. Ring Shaped Inductive Sensors, 1998-2020, Fargo Controls, pp. 1-5 (Year: 2020).\*
Mekre Mesganaw, Case Tamper Detection Reference Design Using Inductive Sensing, Jun. 2017, Texas Instruments Incorporated, TI Designs: TIDA-01377, pp. 1-29 (Year: 2017).\*

\* cited by examiner

*Primary Examiner* — Catherine T. Rastovski
*Assistant Examiner* — Agustin R Campozano
(74) *Attorney, Agent, or Firm* — Jackson Walker L.L.P.

(57) ABSTRACT

A system may include a circuit board comprising a inductor coil formed in a circuit board around a hole formed through the circuit board and a presence detection subsystem configured to measure an electrical quantity occurring within the inductor coil responsive to an alternating current driven to the inductor coil and determine whether an object is present within the hole based on the electrical quantity.

13 Claims, 5 Drawing Sheets

FIG. 7B

SYSTEMS AND METHODS FOR DETECTION OF PRESENCE OF NON-ELECTRICAL COMPONENT

TECHNICAL FIELD

The present disclosure relates in general to information handling systems, and more particularly to systems and methods for detection of presence of a non-electrical component in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To determine if an information handling system has potentially been tampered with, some information handling systems may include intrusion detection systems that detect when a cover of a chassis of an information handling system has been removed. However, in existing intrusion detection systems used in notebook computers, it may be possible to remove one or more screws from a bottom cover of a notebook computer and bend the cover open to access internal components without triggering an intrusion switch. One way to overcome this limitation may be to include multiple intrusion detection switches in the notebook computer; however, such a solution may be costly and may also undesirably consume significant space.

SUMMARY

In accordance with the teachings of the present disclosure, the disadvantages and problems associated with existing approaches to intrusion detection in an information handling system may be reduced or eliminated.

In accordance with embodiments of the present disclosure, a system may include a circuit board comprising an inductor coil formed in a circuit board around a hole formed through the circuit board and a presence detection subsystem configured to measure an electrical quantity occurring within the inductor coil responsive to an alternating current driven to the inductor coil and determine whether an object is present within the hole based on the electrical quantity.

In accordance with these and other embodiments of the present disclosure, a method may include, with respect to a circuit board comprising an inductor coil formed in the circuit board around a hole formed through the circuit board, measuring an electrical quantity occurring within the inductor coil responsive to an alternating current driven to the inductor coil and determining whether an object is present within the hole based on the electrical quantity.

In accordance with these and other embodiments of the present disclosure, an information handling system may include a circuit board comprising an inductor coil formed in a circuit board around a hole formed through the circuit board, a processor, and a presence detection subsystem communicatively coupled to the processor and configured to measure an electrical quantity occurring within the inductor coil responsive to an alternating current driven to the inductor coil and determine whether an object is present within the hole based on the electrical quantity.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7B, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
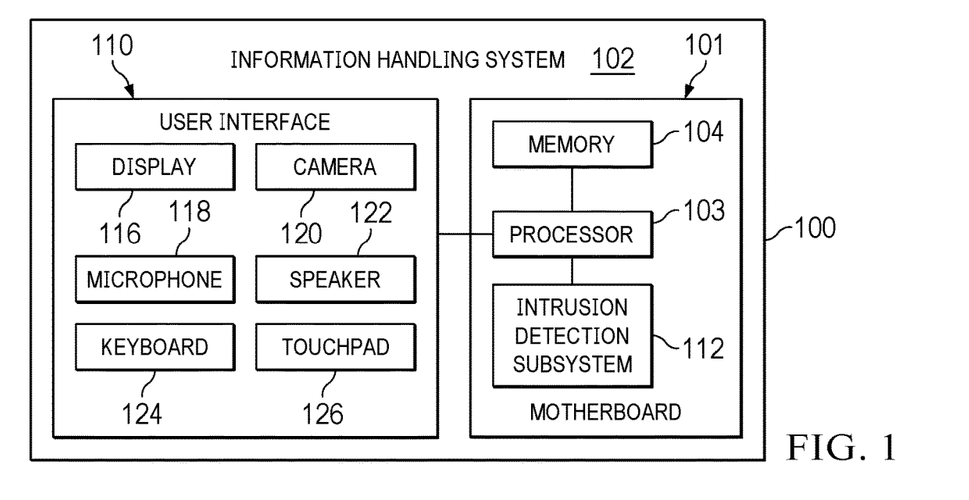
FIG. 1 illustrates a functional block diagram of selected components of an example information handling system, in accordance with embodiments of the present disclosure.

FIG. 1 illustrates a block diagram of an example information handling system 102. In some embodiments, information handling system 102 may be a personal computer (e.g., a desktop computer, a laptop, notebook, tablet, handheld, smart phone, personal digital assistant, etc.). As depicted in FIG. 1, information handling system 102 may include an enclosure 100 housing a plurality of information handling resources including, without limitation, a motherboard 101 and a user interface 110 communicatively coupled to motherboard 101.

Enclosure 100 may include any structure or aggregation of structures that serves as a container for one or more information handling systems and information handling resources, and may be constructed from steel, aluminum, plastic, and/or any other suitable material. Although the term "enclosure" is used, enclosure 100 may also be referred to as a case, cabinet, tower, box, chassis, and/or housing. In some embodiments, chassis 100 may be configured to hold and/or provide power to a plurality of information handling resources.

Motherboard 101 may comprise a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include or have mounted thereon a processor 103, a memory 104 communicatively coupled to processor 103, and an intrusion detection subsystem 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), field-programmable gate array (FPGA), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Intrusion detection subsystem 112 may include any suitable system, device, or apparatus configured to detect when a person has accessed or attempted to access the interior space of enclosure 100. For example, as described in more detail below, intrusion detection subsystem 112 may be configured to detect a presence or absence, within a mounting hole of motherboard 101, of a screw or other fastener used to secure a first portion (e.g., a first cover of a keyboard assembly) of enclosure 100 to a second portion (e.g., a second cover of a keyboard assembly) of enclosure 100.

User interface 110 may comprise any instrumentality or aggregation of instrumentalities by which a user may interact with information handling system 102. For example, user interface 110 may permit a user to input data and/or instructions into information handling system 102 (e.g., via a keypad, keyboard, touch screen, touch pad, microphone, camera, and/or other data input device), and/or otherwise manipulate information handling system 102 and its associated components. User interface 110 may also permit information handling system 102 to communicate data to a user (e.g., via a display device, speaker, and/or other data output device). As shown in FIG. 1, user interface 110 may include one or more of a display 116, a microphone 118, a camera 120, a speaker 122, a keyboard 124, and/or a touchpad 126.

A display 116 may comprise any suitable system, device, or apparatus configured to display human-perceptible graphical data and/or alphanumeric data to a user. For example, in some embodiments, display 116 may comprise a liquid crystal display.

A microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies based on sonic vibrations received at the diaphragm or membrane.

A camera 120 may comprise any system, device, or apparatus configured to record images (moving or still) into one or more electrical signals that may be processed by processor 103.

A speaker 122 may comprise any system, device, or apparatus configured to produce sound in response to electrical audio signal input. In some embodiments, a speaker 122 may comprise a dynamic loudspeaker, which employs a lightweight diaphragm mechanically coupled to a rigid frame via a flexible suspension that constrains a voice coil to move axially through a cylindrical magnetic gap such that when an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Keyboard 124 may include any system, device, or apparatus having a plurality of keys configured to allow a user to provide input to information handling system 102 by interacting with such plurality of keys.

Touchpad 126 (which may also be referred to as a trackpad) may include any system, device, or apparatus that serves as a pointing device, and may include a tactile sensor that can translate the motion and position of a user's fingers to a relative position on the operating system that is made output to the screen.

In addition to motherboard 101, processor 103, memory 104, storage resource 112, and user interface 110, information handling system 102 may include one or more other information handling resources.

Figure 2:
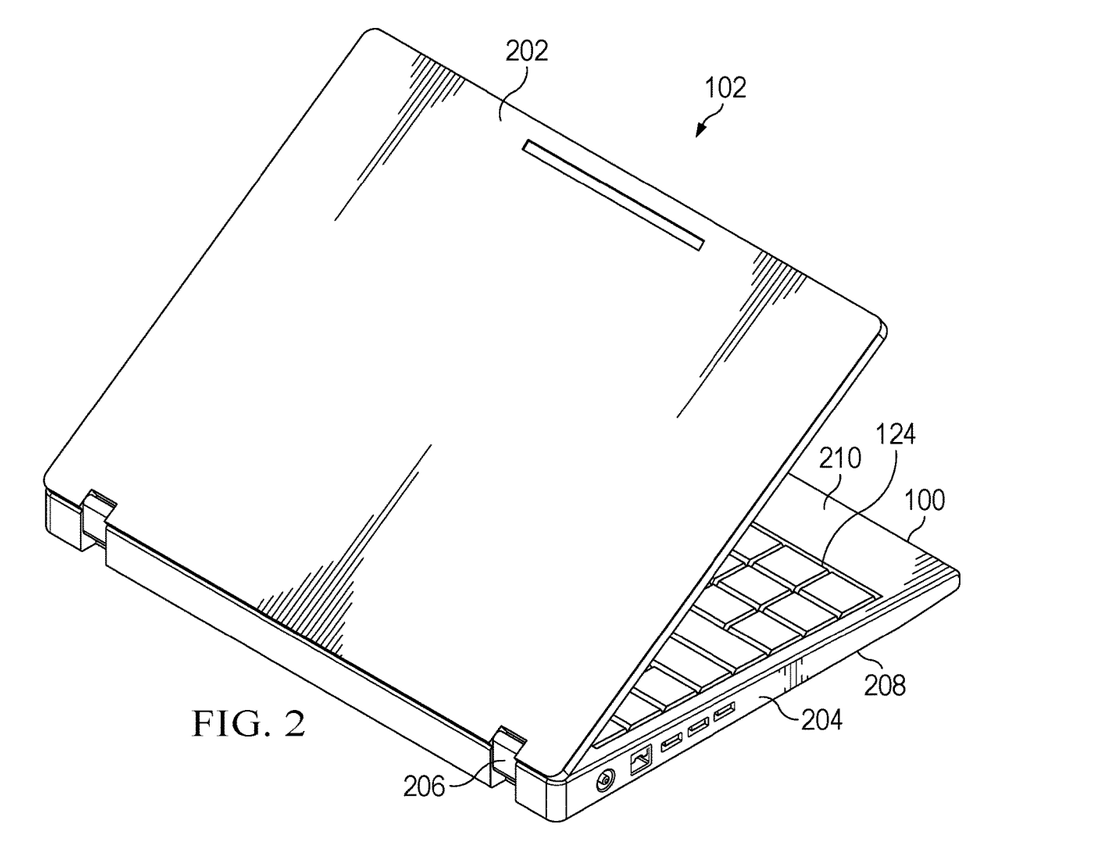
FIG. 2 illustrates an exterior perspective view of an example information handling system, in accordance with embodiments of the present disclosure.

FIG. 2 illustrates a perspective exterior view of example information handling system 102 embodied as a notebook or laptop computer, in accordance with embodiments of the present disclosure. As depicted in FIG. 2, information handling system 102 may include a display assembly 202 (which may house display 116 and/or other information handling resources, and is often referred to in the art as a "hinge-up") and a keyboard assembly 204 (which may house keyboard 124, touchpad 126, and/or other information handling resources, and is often referred to in the art as a "base" or "base assembly") coupled via one or more hinges 206. Each of display assembly 202 and keyboard assembly 204 may be integral parts of an enclosure 100 for information handling system 102. Each of display assembly 202 and keyboard assembly 204 may have an enclosure made from one or more suitable materials, including without limitation plastic, steel, and/or aluminum. Although information handling system 102 is shown in FIG. 2 as having certain components (e.g., display assembly 202, keyboard assembly 204, and hinge 206), information handling system 102 may include any other suitable components which may not have been depicted in FIG. 2 for the purposes of clarity and exposition. In operation, information handling system 102 may be translated between a closed position (e.g., a position of display assembly 202 relative to keyboard assembly 204 such that display assembly 202 substantially overlays keyboard assembly 204, or vice versa) and an open position (e.g., a position of display assembly 202 relative to keyboard assembly 204 such that display assembly 202 does not substantially overlay keyboard assembly 204, or vice versa, such as when the angle formed by display assembly 202 and keyboard assembly 204 at hinge 206 is substantially non-zero). In some embodiments, a user may be able to open information handling system 102 into a tablet mode, by rotating display assembly 202 relative to keyboard assembly 204 to an angle of 360 degrees relative to the closed position.

As shown in FIG. 2, keyboard assembly 204 may be formed using a solid base 208 (a "D-door") mechanically coupled to a cover 210 (sometimes referred to as a "C-cover" or "palm rest") having an opening for exposing keys of keyboard 124 and touchpad 126. Keyboard assembly 204 may enclose numerous functional components of an information handling system 102, including without limitation keyboard 124, motherboard 101, one or more air movers (e.g., fans or blowers) for cooling components of the information handling system 102, and/or other components.

Figure 3:
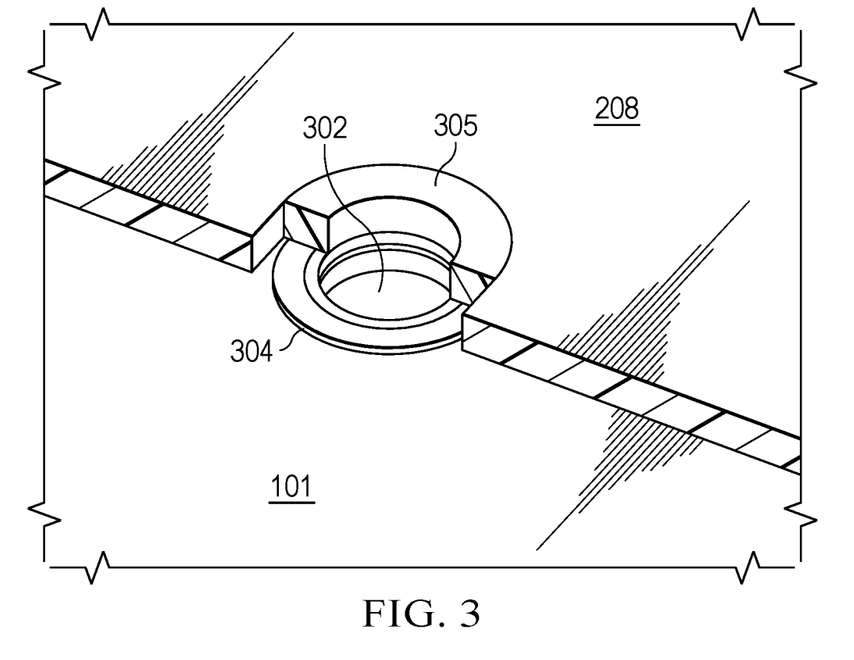
FIG. 3 illustrates a perspective view of selected components of an information handling system, in accordance with embodiments of the present disclosure.

FIG. 3 illustrates a perspective view of selected components of information handling system 102, in accordance with embodiments of the present disclosure. In particular, FIG. 3 illustrates a view of a "bottom" of information handling system 102, with a portion of base 208 cut away for purposes of exposition. To aid in description of FIG. 3, FIG. 4 illustrates a top plan view of a mounting hole 302 formed in motherboard 101, in accordance with embodiments of the present disclosure.

Figure 4:
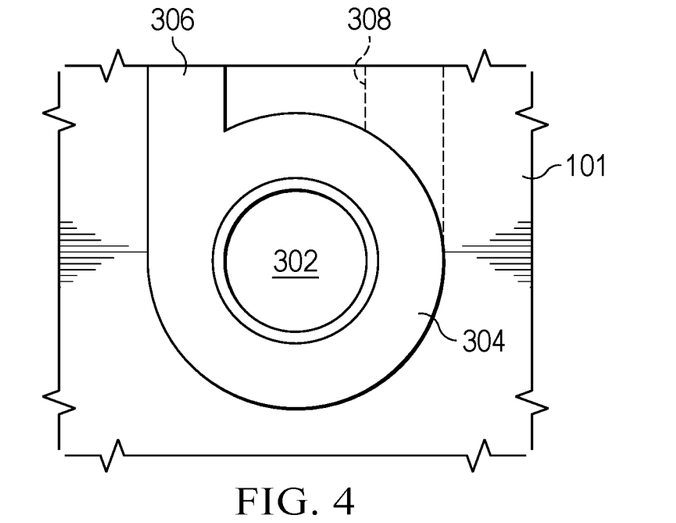
FIG. 4 illustrates a top plan view of a mounting hole formed in a motherboard, in accordance with embodiments of the present disclosure.

As shown in FIGS. 3 and 4, motherboard 101 may have formed therein a mounting hole 302. To mechanically couple base 208 to cover 210, a fastener (e.g., a screw) may be passed through an opening in a guide feature 305 of base 208 and passed through mounting hole 302 to mechanically engage with a corresponding member (e.g., a threaded insert) of cover 210. Base 208, cover 210, and motherboard 101 may have similar mounting features formed throughout for mechanically coupling base 208 to cover 210 and aligning motherboard 101 within keyboard assembly 204.

As also shown in FIGS. 3 and 4, motherboard 101 may have an inductive coil 304 formed proximate to mounting hole 302. For example, inductive coil 304 may be formed from one or more circular rings of conductive material, each circular ring formed on a different layer of motherboard 101 and coupled together by interlayer vias, and with a first terminal 306 formed in a first layer of motherboard 101 and a second terminal 308 formed in a second layer of motherboard 101.

Figure 5:
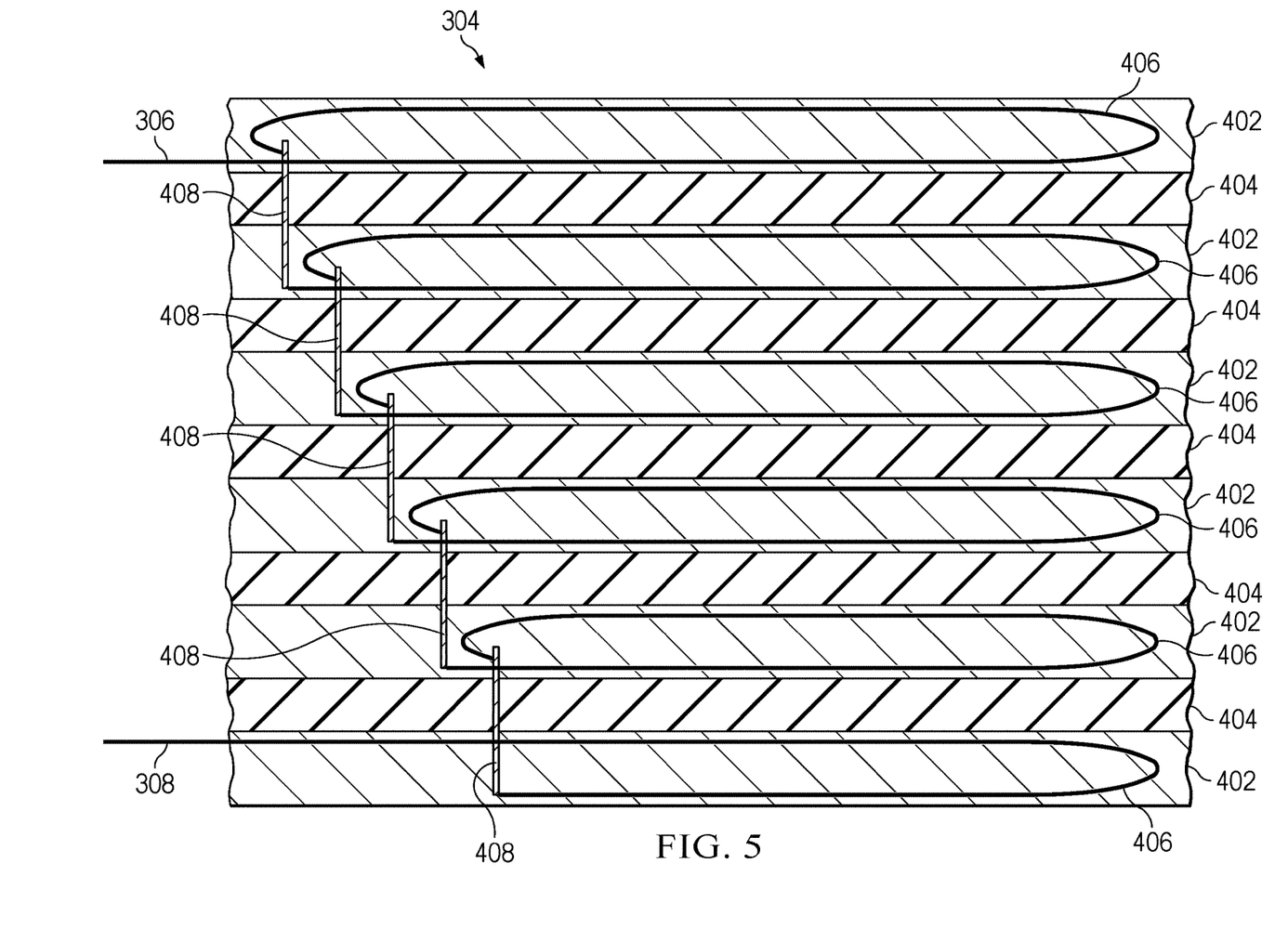
FIG. 5 illustrates a side elevation view of an inductive coil formed in a motherboard, in accordance with embodiments of the present disclosure.

FIG. 5 illustrates a side elevation view of an inductive coil 304 formed in motherboard 101, in accordance with embodiments of the present disclosure. As shown in FIG. 5, motherboard 101 may comprise a circuit board comprising alternating conductor layers 402 and dielectric layers 404, wherein traces of copper or other electrically-conductive material can be patterned on conductor layers 402. Inductive coil 304 may be formed by forming circular or elliptical traces 406 in each of a plurality of conductor layers 402 and electrically coupling the various traces 406 by way of vias 408 extending between conductor layers 402, with terminals 306 and 308 formed in two of conductor layers 402. For purposes of clarity and exposition, vias 408 are depicted in FIG. 5 as microvias. However, through-hole vias may be used to implement one or more of vias 408.

Figure 6A:
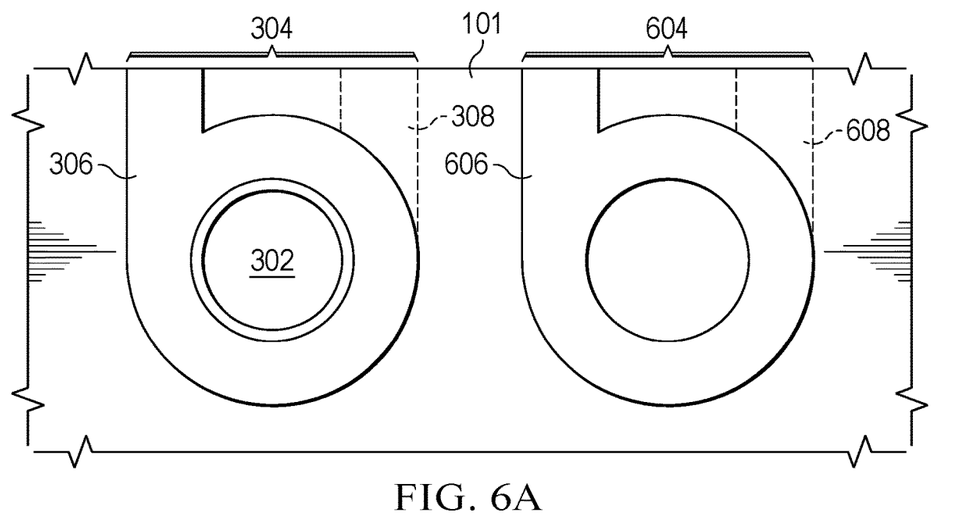
FIG. 6A illustrates a top plan view of an inductive coil proximate to a secondary coil, in accordance with embodiments of the present disclosure.
Figure 6B:
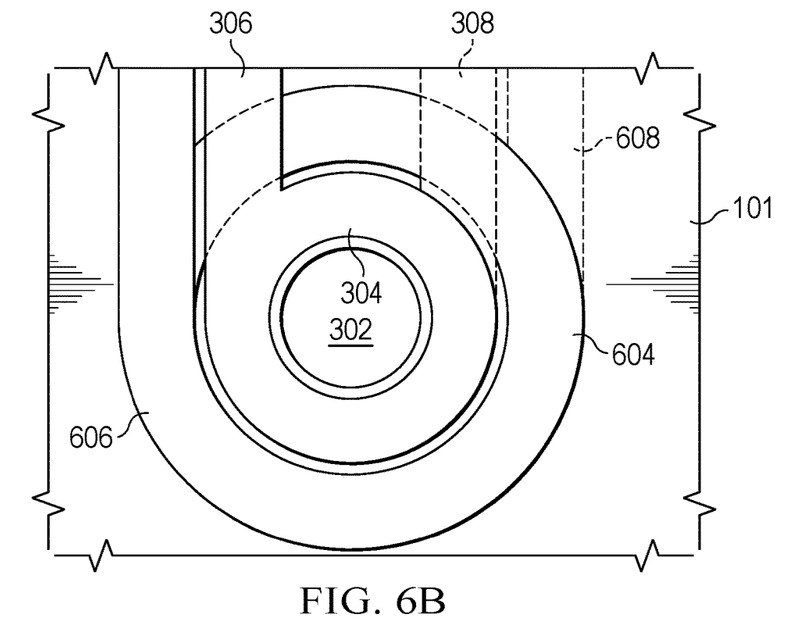
FIG. 6B illustrates a top plan view of an inductive coil proximate to a secondary coil, in accordance with embodiments of the present disclosure.

Inductive coil 304 formed in motherboard 101 may be formed proximate to a secondary coil also formed in motherboard 101. For example, as shown in FIG. 6A, a secondary coil 604 may be formed adjacent to inductive coil 304. As another example, as shown in FIG. 6B, secondary coil 604 may be formed having circular or elliptical traces that are concentric to the circular or elliptical traces of inductive coil 304. In any event, secondary coil 604 may be formed in a manner similar to that of inductive coil 304 as shown in FIG. 5 and described above. As also shown in FIGS. 6A and 6B, secondary coil 604 may have a first terminal 606 formed in one layer of motherboard 101 and a second terminal 608 formed in a second layer of motherboard 101.

Figure 7A:
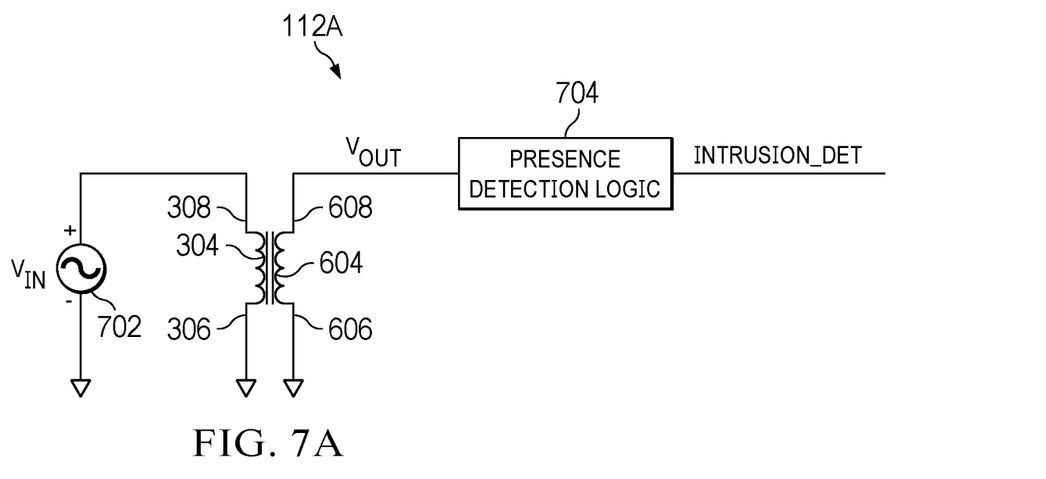
FIG. 7A illustrates a functional block and circuit diagram of selected components of an intrusion detection system, in accordance with embodiments of the present disclosure.

FIG. 7A illustrates a functional block and circuit diagram of selected components of an intrusion detection system 112A (which may be used to implement intrusion detection system 112), in accordance with embodiments of the present disclosure. As shown in FIG. 7A, intrusion detection system 112A may include an alternating current (AC) voltage source 702, inductive coil 304, secondary coil 604, and presence detection logic 704. In operation, AC voltage source 702 may generate an AC input voltage $V_{IN}$, such that an alternating magnetic field is produced surrounding inductive coil 304. Further, in accordance with Faraday's law of magnetic induction, if secondary coil 604 is within the magnetic field generated around inductive coil 304, such magnetic field may induce an alternating current within secondary coil 604 that may generate an AC output voltage $V_{OUT}$.

The magnetic field generated in response to AC voltage $V_{IN}$ may differ between when a screw or other fastener is present within mounting hole 302 (and thus also present within inductive coil 304) and when such screw or other fastener is absent from mounting hole 302 (and thus also absent from within inductive coil 304). Thus, assuming a steady-state AC input voltage $V_{IN}$, AC output voltage $V_{OUT}$ may vary as a function of whether the screw or other fastener is present or absent. Accordingly, presence detection logic 704 may detect AC output voltage $V_{OUT}$, compare AC output voltage $V_{OUT}$ to a reference voltage, and based on such comparison, generate a signal INTRUSION_DET indicative of whether the screw or other fastener is present or absent, which may indicate whether an attempt has been made to intrude into the interior of enclosure 100. In some embodiments, presence detection logic 704 may communicate signal INTRUSION_DET to processor 103 where such signal may be further processed in order to take remedial action, including communicating such event to a user. In some embodiments, all or a portion of intrusion detection system 112A may be implemented by a management controller, an enclosure controller, or another component capable of detecting presence and absence of the screw or other fastener when information handling system 102 is powered off or operating in a low-power state such that processor 103 is inactive.

Figure 7B:
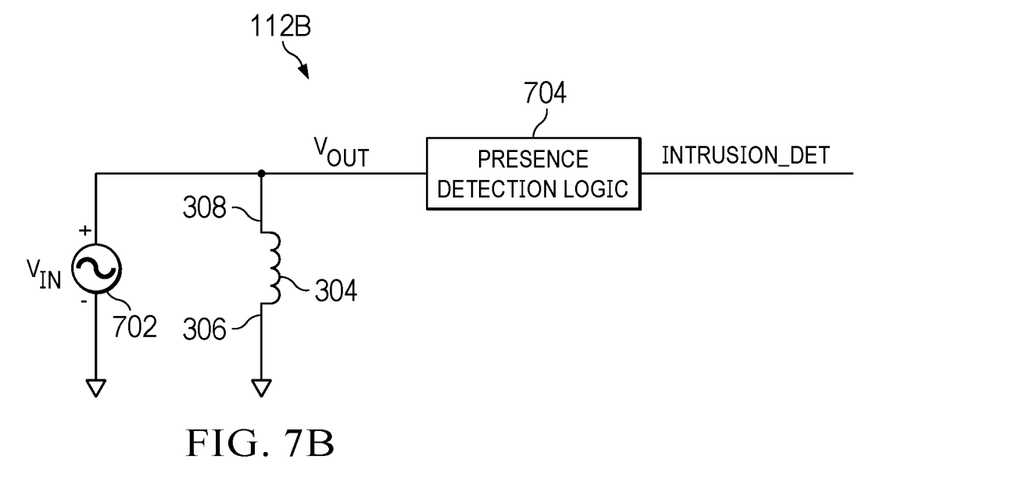
FIG. 7B illustrates a functional block and circuit diagram of selected components of another intrusion detection system, in accordance with embodiments of the present disclosure.

FIG. 7B illustrates a functional block and circuit diagram of selected components of an intrusion detection system 112B (which may be used to implement intrusion detection system 112), in accordance with embodiments of the present disclosure. As shown in FIG. 7B, intrusion detection system 112B may include an alternating current (AC) voltage source 702, inductive coil 304, and presence detection logic 704. In operation, AC voltage source 702 may generate an AC input voltage $V_{IN}$, such that an alternating magnetic field is produced surrounding inductive coil 304.

The magnetic field generated around inductive coil 302 in response to AC voltage $V_{IN}$ may differ between when a screw or other fastener is present within mounting hole 302 (and thus also present within inductive coil 304) and when such screw or other fastener is absent from mounting hole 302 (and thus also absent from within inductive coil 304). Thus, assuming a steady-state AC input voltage $V_{IN}$, AC output voltage $V_{OUT}$ may vary as a function of whether the screw or other fastener is present or absent. Accordingly, presence detection logic 704 may detect AC output voltage $V_{OUT}$, compare AC output voltage $V_{OUT}$ to a reference voltage, and based on such comparison, generate a signal INTRUSION_DET indicative of whether the screw or other fastener is present or absent, which may indicate whether an attempt has been made to intrude into the interior of enclosure 100. In some embodiments, presence detection logic 704 may communicate signal INTRUSION_DET to processor 103 where such signal may be further processed in order to take remedial action, including communicating such event to a user. In some embodiments, all or a portion of intrusion detection system 112B may be implemented by a management controller, an enclosure controller, or another component capable of detecting presence and absence of the screw or other fastener when information handling system 102 is powered off or operating in a low-power state such that processor 103 is inactive.

In some embodiments, an information handling system 102 may include a plurality of intrusion detection subsystems 112 to detect presence or absence of screws or other fasteners at multiple locations. Alternatively, in some embodiments, intrusion detection subsystem 112 may include a single instance of presence detection logic 704 coupled to a plurality of secondary coils 604 inductively-coupled to respective inductive coils 304, and may be further configured to determine whether an intrusion has occurred based on analyzing voltages induced across the various secondary coils 604.

Further, although the foregoing completes the use of inductively-coupled coils to determine the presence or absence of a screw within one of such inductively-coupled coils, in some embodiments, systems and methods identical or substantially similar to those described above may be configured to detect the presence or absence of other non-electrical components (e.g., an alignment pin of a heatsink, an alignment pin of a cable, etc.).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a circuit board comprising an inductor coil formed in a circuit board around a hole formed through the circuit board; and
    a presence detection subsystem configured to:
        measure an electrical quantity occurring within the inductor coil responsive to an alternating current driven to the inductor coil; and
        determine whether an object is present within the hole based on the electrical quantity.

2. The system of claim 1, further comprising:
    a second inductor coil formed in the circuit board proximate to the inductor coil such that an alternating magnetic field surrounding the inductor coil induces an alternating current through the second inductor coil; and
    wherein measuring the electrical quantity occurring within the inductor coil comprises measuring an electrical quantity occurring within the second inductor coil responsive to the alternating current driven to the inductor coil.

3. The system of claim 1, wherein the object is a fastener for mechanically coupling the circuit board to a mechanical component.

4. The system of claim 1, wherein the electrical quantity is a voltage.

5. A method comprising, with respect to a circuit board comprising an inductor coil formed in the circuit board around a hole formed through the circuit board:
    measuring an electrical quantity occurring within the inductor coil responsive to an alternating current driven to the inductor coil; and
    determining whether an object is present within the hole based on the electrical quantity.

6. The method of claim 5, wherein:
    the circuit board further comprises a second inductor coil formed in the circuit board proximate to the inductor coil such that an alternating magnetic field surrounding the inductor coil induces an alternating current through the second inductor coil; and
    measuring the electrical quantity occurring within the inductor coil comprising measuring an electrical quantity occurring within the second inductor coil responsive to the alternating current driven to the inductor coil.

7. The method of claim 5, wherein the object is a fastener for mechanically coupling the circuit board to a mechanical component.

8. The method of claim 5, wherein the electrical quantity is a voltage.

9. An information handling system comprising:
    a circuit board comprising an inductor coil formed in a circuit board around a hole formed through the circuit board;
    a processor; and
    a presence detection subsystem communicatively coupled to the processor and configured to:
        measure an electrical quantity occurring within the inductor coil responsive to an alternating current driven to the inductor coil; and
        determine whether an object is present within the hole based on the electrical quantity.

10. The information handling system of claim 9, wherein:
    the circuit board further comprises a second inductor coil formed in the circuit board proximate to the inductor coil such that an alternating magnetic field surrounding the inductor coil induces an alternating current through the second inductor coil; and
    measuring the electrical quantity occurring within the inductor coil comprises measuring an electrical quantity occurring within the second inductor coil responsive to the alternating current driven to the inductor coil.

11. The information handling system of claim 9, wherein the object is a fastener for mechanically coupling the circuit board to a mechanical component.

12. The information handling system of claim 11, wherein the mechanical component is an enclosure of the information handling system.

13. The information handling system of claim 9, wherein the electrical quantity is a voltage.

* * * * *